(12) United States Patent
Costabel

(10) Patent No.: US 9,169,019 B2
(45) Date of Patent: Oct. 27, 2015

(54) FASTENING SYSTEM FOR SUSPENDED OVERHEAD STORAGE BINS

(75) Inventor: Sascha Costabel, Muhlacker (DE)

(73) Assignee: SFS intec Holding AG, Heerbrugg (CH)

( * ) Notice: Subject to any disclaimer, the term of this patent is extended or adjusted under 35 U.S.C. 154(b) by 526 days.

(21) Appl. No.: 13/641,952

(22) PCT Filed: Apr. 19, 2011

(86) PCT No.: PCT/EP2011/056205
§ 371 (c)(1),
(2), (4) Date: Oct. 18, 2012

(87) PCT Pub. No.: WO2011/134839
PCT Pub. Date: Nov. 3, 2011

(65) Prior Publication Data
US 2013/0032684 A1    Feb. 7, 2013

(30) Foreign Application Priority Data
Apr. 27, 2010  (DE) .......................... 10 2010 016 661

(51) Int. Cl.
*B64D 11/00*    (2006.01)

(52) U.S. Cl.
CPC .................................... *B64D 11/003* (2013.01)

(58) Field of Classification Search
CPC .............. B64C 1/00; B64C 1/06; B64C 1/14; B64C 1/20; B64C 1/22; B64D 11/00; B64D 11/003
USPC ............ 403/321, 324–328; 244/118.1, 118.5, 244/129.4, 131
See application file for complete search history.

(56) References Cited

U.S. PATENT DOCUMENTS 2,518,207 A * 8/1950 Wagner .......................... 292/175
3,666,214 A * 5/1972 Matuska .......................... 410/84

(Continued)

FOREIGN PATENT DOCUMENTS

| DE | 102006016509 | 10/2007 |
|----|--------------|---------|
| DE | 102008025232 | 12/2009 |
| DE | 102008048499 | 5/2010 |
| WO | 2009130268 | 10/2009 |

OTHER PUBLICATIONS

"Cabin Development—New Approach for the A350—Cabin Customization" One (magazine), German edition, Dec. 18, 2006, p. 23.

*Primary Examiner* — Daniel Wiley
(74) *Attorney, Agent, or Firm* — Volpe and Koenig, P.C.

(57) ABSTRACT

A fastening system for overhead storage bins on a supporting structure, having at least one pair of suspension eye lugs attached to a supporting structure or the overhead storage bins. The suspension eye lugs are detachably interconnected by a main pin, with receivers for the main pin being in alignment in a mounting position of the overhead storage bin. The main pin is spring-loaded in a main pin guide toward the other suspension eye lug and has, with the overhead storage bin not yet mounted, an end position in which the main pin is deployed from the main pin guide. A portion of the suspension eye lugs has a sloping ramp that allows the main pin to be deployed in the receiver of the other suspension eye lug by action of preload during upward movement of the overhead storage bin and its suspension eye lug into the mounting position.

10 Claims, 5 Drawing Sheets

(56) References Cited

U.S. PATENT DOCUMENTS

| | | | | |
|---|---|---|---|---|
| 3,700,199 | A | * | 10/1972 | Matuska .................... 244/118.1 |
| 4,375,281 | A | * | 3/1983 | Nichols ........................ 244/121 |
| 5,108,048 | A | * | 4/1992 | Chang ........................ 244/118.1 |
| 7,342,796 | B2 | * | 3/2008 | Aukzemas .................... 361/719 |
| 2004/0096263 | A1 | * | 5/2004 | Aquino et al. .................. 403/24 |
| 2010/0074673 | A1 | * | 3/2010 | Horst et al. .................... 403/14 |

* cited by examiner

FASTENING SYSTEM FOR SUSPENDED OVERHEAD STORAGE BINS

BACKGROUND

The invention relates to a fastening system for overhead storage bins that can be mounted on a supporting structure in a suspended manner, with at least one pair of suspension eye lugs that can be attached to the supporting structure or to one of the overhead storage bins, with a main pin for the detachable interconnection of the suspension eye lugs, and with receivers that are attached to the suspension eye lugs for the main pin and that align with each other in an installation position of the overhead storage bin, wherein a part of one of the suspension eye lugs is constructed like an inclined ramp, wherein a main pin guide is provided in the receiver of one of the suspension eye lugs, wherein the main pin is spring-loaded in the main pin guide in the direction of the other suspension eye lug and assumes, when the overhead storage bin has not yet been mounted, an end position in which the main pin is extended out of the main pin guide, and wherein the main pin can be extended by the spring bias loading into the receiver of the other suspension eye lug by the part of one of the suspension eye lugs formed like an inclined ramp during the upward movement of the overhead storage bin and its suspension eye lug into the installation position.

Below, such a fastening system is indeed described in its use for the mounting of overhead storage bins, such as luggage containers, on the supporting structure of an aircraft. Such a fastening system, however, can be used anywhere it is applicable to mount overhead storage bins in a suspended manner. The suspension eye lug provided with the main pin guide is indeed advantageously mounted on the supporting structure, but the suspension eye lugs of a pair could be exchanged one for the other. In the development of new cabins for new models of aircraft, such as the Airbus A350, the goal is to design elements to be mounted on the fuselage, such as toilets, galley kitchens, passenger seats, cabin power networks, cabin lighting and air nozzles, overhead storage bins, and parcel shelves each as a complete cabin module, wherein, however, all connecting points are to be constructed as flexible standardized interfaces and wherein simplified fastening designs are to be used that allow installation and removal without the use of tools (cf. the article "Cabin development—a new approach for the A350—cabin customization," Zeitschrift One, German edition, Dec. 18, 2006, p. 23).

In a known fastening, which is used for the suspended mounting of luggage containers in an aircraft, more than three people are required for mounting each luggage container. At least three people lift the luggage container into an installation position. A pin (loose part) connects the suspension eye lugs of each pair to each other. For mounting these pins, special tools are required, such as hammers, pliers, etc. Moreover, the known fastening system does indeed make possible a secure fastening of the luggage containers on the supporting structure, wherein the fastening system distinguishes itself through its light weight, good force absorption, low price per part, and a small number of components, but opposing these features are relatively long installation and removal times, the relatively large number of people required for installing and removing a luggage container, and the need for tools. The loose pins could also be lost. These limitations have the result that attention must be paid in the cabin configuration of aircraft to manage with as few variants as possible. This is associated with loss of flexibility in the cabin configuration. It is also disadvantageous that the removal is complicated, because the pins can be removed again only with difficulty and typically only with special tools.

An older proposal of the applicant (corresponding to the document DE 10 2009 026 250 A1 that was not yet published on the priority date of the present application) involves constructing a fastening system so that it makes possible a faster and simpler installation and removal of overhead storage bins, such as luggage containers, on a supporting structure, in particular, in wide-body aircraft, wherein installation and removal should be possible with two people, without special tools, and without loose parts.

For this purpose, according to the older proposal, a pin guide is provided in one supporting sleeve in alignment with its receiver sleeve, wherein the pin is retracted into this pin guide but it can be locked in a spring-loaded manner in the direction of a receiver sleeve of the receiver of one of the suspension eye lugs and can be unlocked by at least approximately aligning the receivers of the suspension eye lug pair and can be extended at least into a receiver sleeve of the receiver of the other suspension eye lug in which a suspension eye lug is formed in a suspension sleeve.

In the fastening system according to the older proposal, the non-extended pin is located in the pin guide under spring bias loading. The pin is thus not a loose part, but instead mounted captively from the beginning on one of the suspension eye lugs of the pair. This allows the installation of an overhead storage bin by fewer people than in the prior art, because the overhead storage bins must be lifted only until the receiver sleeves attached to the suspension eye lugs are essentially aligned with each other. In this way, the pin is released and is then extended by the existing spring bias loading into the receiver sleeve of the other suspension eye lug. Thus, the overhead storage bin is already locked onto one suspension eye lug. The pin can then be completely extended by hand if necessary at a later time and inserted into the receiver sleeve of the suspension eye lug. Removal is just as easy in the reverse sequence, without the need for a special tool for extending and retracting the pin. One of the people who have lifted the overhead storage bin up into the installation position is free after the first locking of the other suspension eye lug on the first suspension eye lug and can work on the final extension of the pin. The fastening system according to the older proposal thus allows easier installation and removal of overhead storage bins, such as luggage containers, that can be mounted in a suspended manner in aircraft with lower personnel costs. The safety is also increased, because there are no loose parts that could be lost and could cause interruptions. At the same time, more flexibility is achieved in the cabin equipment. The simple fastening system according to the older proposal allows many more variants than in the prior art.

From US 2010/0 074 673 A1, a fastening system is known for overhead storage bins that can be mounted in a suspended manner on a supporting structure, wherein this system comprises a preliminary locking device and a main locking device. The preliminary locking device is used during installation for the automatic, temporary fixing of the overhead storage bin on the supporting structure. The main locking device is then activated, in order to finally fix the overhead storage bin. The preliminary locking device is arranged below a main pin of the main locking device when viewed in the insertion direction. During the installation of the overhead storage bin, the main pin remains in its unlocked position, while a pressure part of the preliminary locking device is spring-loaded in the locking position. The main pin of the main locking device has thicker dimensions in comparison with the pressure part of the preliminary locking device, in order to absorb the static and dynamic forces during operation. The provision of a main locking device and a preliminary locking device makes the known fastening system complicated.

A fastening system of the type noted above is known from the document DE 10 2006 016 509 A1. This fastening system requires installation in two phases. In the first phase, the overhead storage bin is suspended with catch elements constructed as hooks in bearing elements. In the second phase, the overhead storage bin is then pivoted into the installation position. Here, two bolts are inserted into two locking elements and locked by engaging and setting a spring bias load. The locking can be released again through manual activation, in which a catch piece is shifted against the spring bias loading.

A similar fastening system is known from the document DE 10 2008 025 232 A1. It comprises a locking mechanism for mounting an aircraft interior equipment component to an aircraft structure, comprising a guide groove with an opening, a bolt that can be brought into engagement with the guide groove, and a spring-loaded closing element that frees the opening of the guide groove in a first position and closes the opening of the guide groove in a second position. The closing element is designed to be automatically returned into the second position due to the effect of its spring loading and to close the guide groove. The locking position is then maintained by the spring loading of the closing element.

From the document WO 2009/130268 A1, a fastening system for fastening an aircraft interior equipment element is known in which the interior equipment element is first suspended on a first fastening device, in order to then be pivoted into its actual installation position in which it is then locked by a second fastening device using a second locking device under spring bias loading.

SUMMARY

The objective of the invention is to disclose a fastening system of the type noted above with a safer design.

Starting with a fastening system of the type named above, this task is achieved according to the invention in that the receiver of the other suspension eye lug has a stop on which the main pin can be brought into contact due to the spring bias loading when it is being extended, and the main pin can be locked with a positive-fit connection to the stop by manual activation, wherein the stop is a peg arranged centrally in the receiver of the other suspension eye lug and the main pin has a complementarily shaped hole in which the peg can be held.

Due to the positive-fit locking of the main pin with the stop, the main pin reaches a position in which the overhead storage bin is securely attached to the supporting structure. The fastening is released again only through manual detachment of the positive-fit locking between the main pin and the peg. Then the main pin can be pulled out from the receiver again, a process preferably performed with the help of a tool.

The fastening system according to the invention is equipped, in contrast to the fastening system according to US 2010/0 074 673 A1 already mentioned above, with only one locking device that is simultaneously the preliminary and main locking device and has a main pin that is constructed essentially just like the pressure part of the preliminary locking device of this known fastening system. The fastening system according to the invention thus makes one of the two locking devices of the known fastening system, namely the preliminary locking device, unnecessary and consequently has a significantly less complicated construction than the known fastening system.

The fastening system according to the invention has the same advantages as the fastening system according to the older proposal mentioned above. The fastening system according to the invention, however, is simpler than the fastening system according to the older proposal, because the main pin does not have to be unlocked during the upward movement of the overhead storage bin and its suspension eye lug, because the main pin is already extended and only has to be pushed back until it can be automatically extended into the receiver of the other suspension eye lug under the existing spring bias loading. Therefore, in the fastening system according to the invention, the other suspension eye lug manages with one receiver and the locking element moving perpendicular to the pin and provided in the fastening system according to the older proposal for locking the pin inserted there and its release support are eliminated. In addition, in the fastening system according to the invention, a lever hinged on the main pin guide is also eliminated for the manual retraction of the main pin into the pin guide and for extending the pin into the receiver sleeve of the suspension eye lug. Therefore, an even simpler and faster installation and removal with even fewer aids is possible with the fastening system according to the invention. For removing an overhead storage bin provided with the fastening system according to the invention, only the main pin locked in the receiver has to be released, which is easily possible with the help of a tool that engages on one end of the main pin, in order to release the main pin and push it backward.

In the fastening system according to the invention, the main pin is thus brought into a position that simplifies its later locking in the receiver of the other suspension eye lug.

The positive-fit locking of the main pin to the stop can be realized with the help of a tool that is the sole tool that is absolutely necessary for the use of the fastening system according to the invention.

The lever used in the older proposal for the manual extension of the pin until its free end is located in the receiver sleeve of the suspension eye lug provided with the pin guide is eliminated in the fastening system according to the invention.

Advantageous constructions of the fastening system according to the invention form the subject matter of the dependent claims.

In one construction of the fastening system according to the invention, the other suspension eye lug has funnel-shaped contours at least in its area surrounding the ramp-like part. This construction allows a simple and targeted insertion of the main pin into the receiver of the other suspension eye lug.

In another construction of the fastening system according to the invention, the main pin and the peg can be locked with each other by means of a screw-thread connection. In this construction, the peg has to be constructed as a threaded shaft and the main pin has to be provided with a corresponding threaded hole, in order to allow the mutual locking of the main pin and peg by rotating the main pin.

In another construction of the fastening system according to the invention, the main pin and the peg can be locked with each other by means of a bayonet mount. Such a connection makes a thread on the peg and on the main pin unnecessary and reduces the locking movement to a rotational movement of the main pin of, for example, 90° or 180°.

In another construction of the fastening system according to the invention, the main pin has a force transmission contact for a tool on the side facing away from the other suspension eye lug. This construction simplifies the rotation of the main pin for locking this pin with the peg and also for unlocking this pin.

In another construction of the fastening system according to the invention, the main pin has an inner longitudinal hole in which a helical spring is arranged for generating the spring bias loading. This helical spring is supported on one end on the main pin and on the other end on a transverse shaft that is anchored in the receiver and is held in two diametrically opposite elongated holes of the main pin. This construction of the invention allows, in a simple way, the displacement and rotation of the main pin required for the engaging of the main pin in the receiver of the other suspension eye lug or for the locking therein.

In another construction of the fastening system according to the invention, a first pair of suspension eye lugs and a second pair of suspension eye lugs can be attached one next to the other to two adjacent suspension points of two adjacent overhead storage bins. The arrangement is made here as in the older proposal so that when the overhead storage bins are mounted, for example, one overhead storage bin with the first suspension eye lug pair prevents movement in the X, Y, and Z directions and the other overhead storage bin with the second suspension eye lug prevents movement in the Y and Z directions.

In another construction of the fastening system according to the invention, the two other suspension eye lugs of the two pairs in which the main pins can be extended into the installation position are constructed as a multiple suspension eye lug in which multiple receivers are arranged. The multiple suspension eye lug provided in this construction of the invention has less spatial requirements than multiple individual suspension eye lugs, so that adjacent overhead storage bins or the like can be arranged at a closer distance.

In another construction of the fastening system according to the invention, the previously mentioned multiple suspension eye lug is constructed as a double suspension eye lug in which two receivers are arranged back to back. The double suspension eye lug provided in this construction of the invention has less spatial requirements than two individual suspension eye lugs that are arranged one next to the other and would otherwise be used when two overhead storage bins are to be mounted adjacent to each other. With the help of the double suspension eye lug, the adjacent overhead storage bins can be arranged at a closer distance.

In another construction of the fastening system according to the invention, the overhead storage bins that can be mounted on the supporting structure in a suspended manner are luggage containers in an aircraft.

BRIEF DESCRIPTION OF THE DRAWINGS

Embodiments of the invention will be described in more detail below with reference to the drawings. Shown are:

FIGS. 1-4 are views showing four phases of installing an overhead storage bin (shown only in FIG. 1) on a supporting structure (shown only in FIG. 1), wherein FIG. 1 shows the non-installed state of the overhead storage bin, FIG. 2 shows the upward movement of the overhead storage bin with respect to the supporting structure, FIG. 3 shows when the installation position is reached, and FIG. 4 shows a secured installation position, and wherein, in FIG. 2, half of an upper suspension eye lug is shown in section, in order to make visible the inner construction of a receiver for a main pin attached to a suspension eye lug of the overhead storage bin.

DETAILED DESCRIPTION OF THE PREFERRED EMBODIMENTS

Figure 1:
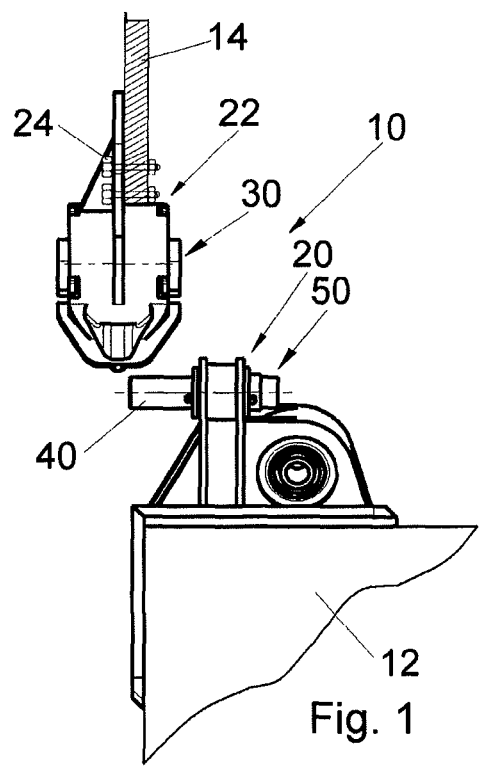
Figure 2:
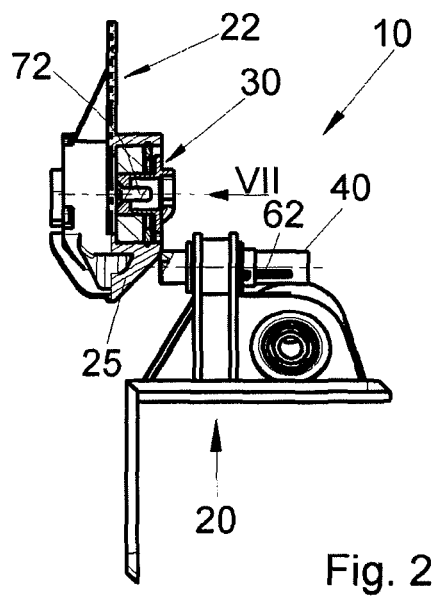
Figure 3:
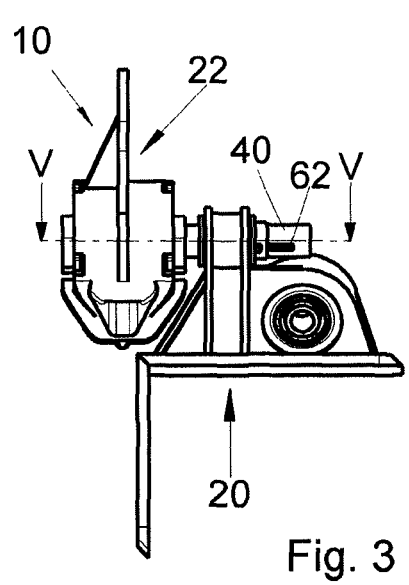
Figure 4:
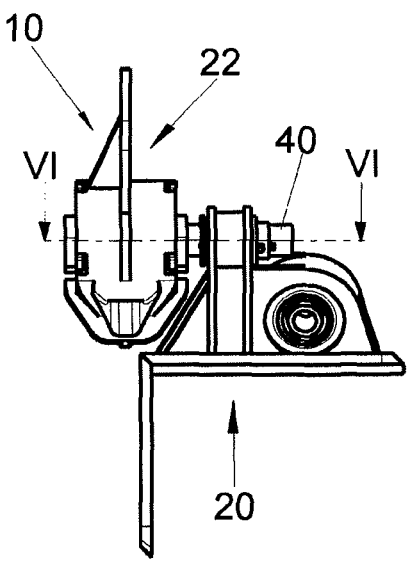

FIGS. 1-4 show a preferred embodiment of a fastening system designated overall with 10 according to the invention, wherein the mounting of an overhead storage bin 12 shown only in FIG. 1 on a supporting structure 14, e.g., of an aircraft, shown only in FIG. 1 is shown in four phases. The overhead storage bin 12 could be a luggage container or the like in an aircraft. The fastening system 10 comprises a pair of suspension eye lugs (called brackets in aeronautical engineering) that are designated overall with 20 or 22. The suspension eye lug 20 (called C-bracket in aeronautical engineering) is attached to the overhead storage bin 12. The suspension eye lug 22 is constructed for fastening to the supporting structure 14. This fastening is indicated in FIG. 1 by two screws with nuts that are guided through holes 24 in a fastening tab 23 of the suspension eye lug 22 (more clearly visible in FIG. 7) and through corresponding holes in the supporting structure 14. In FIG. 2, the right half of the suspension eye lug 22 is also shown in section, in order to make visible a receiver designated overall with 30 for a main pin 40 attached to the suspension eye lug 20. A suspension eye lug that has only the right part of the suspension eye lug 22 shown in section in FIG. 2 would be sufficient for the purpose described here. Such a suspension eye lug and the suspension eye lug 20 could be interchanged. In FIGS. 1-4, however, the suspension eye lug 22 is constructed as a double suspension eye lug (called B-bracket in aeronautical engineering) that is used in the mounting of two adjacent overhead storage bins 12 as shown in the embodiment shown in FIG. 11 and described in more detail farther below. The fastening system 10 is shown in FIG. 1 for a non-installed overhead storage bin, i.e., the suspension eye lugs 20, 22 are not connected to each other by the main pin 40, as shown in FIGS. 3 and 4 for the mounted state, but instead are still separated from each other. The suspension eye lugs 20, 22 can be connected to each other detachably by the main pin 40 and in this way the overhead storage bin 12 can be mounted on the supporting structure 14 in a suspended manner. Below, the two suspension eye lugs 20, 22 will now be described first individually.

Figure 5:
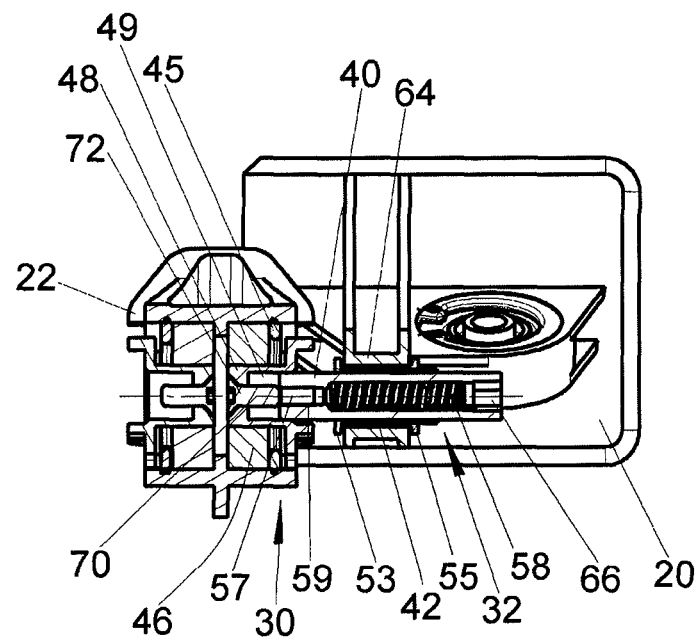
FIG. 5 is a sectional view along the line V-V in FIG. 3.
Figure 6:
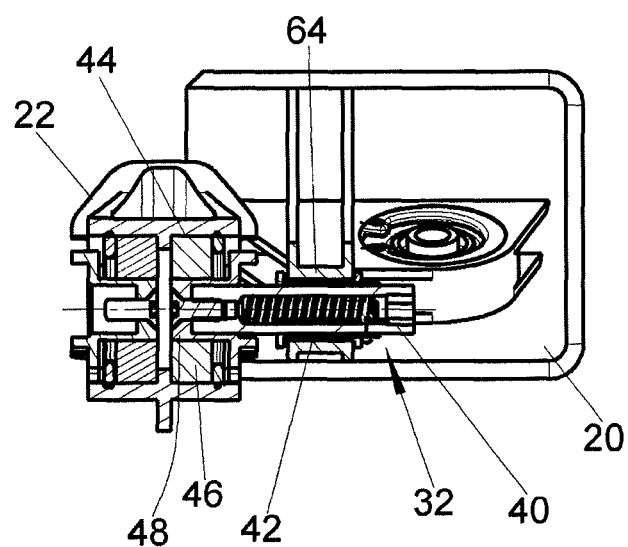
FIG. 6 is a section view along the line VI-VI in FIG. 4.
Figure 9:
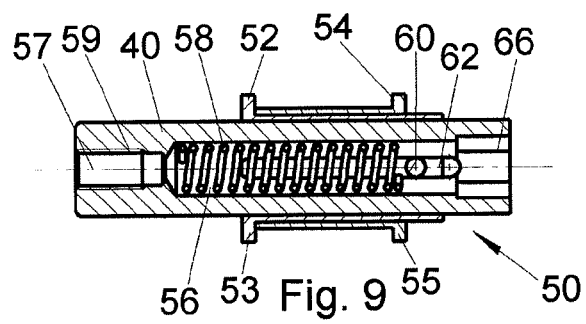
FIG. 9 is the main pin guide in a longitudinal section view along the line IX-IX in FIG. 8.
Figure 8:
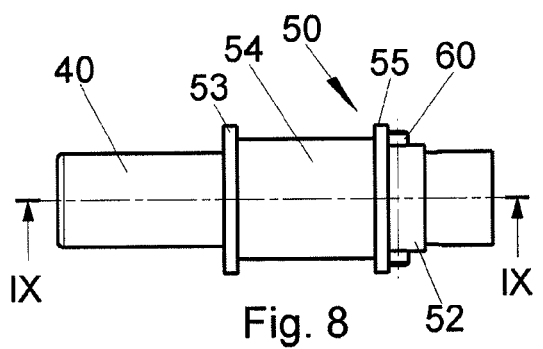
FIG. 8 is a detail of a main pin guide in a side view.

According to the representation in FIGS. 1-6, the suspension eye lug 20 comprises an eye 42 as a receiver 32 for a main pin guide designated overall with 50. The main pin 40 is supported so that it can move in a bearing bushing 52. The bearing bushing 52 is supported on its side so that it can rotate in a sliding bushing 54. The sliding bushing 54 is fixed on its side in the eye 42. The main pin 40 has an inner elongated hole 56 in which a helical spring 58 is arranged for generating a spring bias loading. This helical spring is supported on its end on the left in FIG. 9 on the main pin 40 and on its other end on a transverse shaft 60. The transverse shaft 60 extends through the elongated hole 56 and through two adjacent elongated holes 62 of the main pin 40 and also through two holes in the bearing bushing 52, so that it projects from the bearing bushing 52 with its two ends and is supported on a collar of the sliding bushing 54, as can be seen from the representation in FIGS. 8 and 9. In this way, a rotational movement of the main pin 40 together with the bearing bushing 52 in the sliding bushing 54 is possible and moreover the displacement of the main pin 40 on the transverse shaft 60 within the limits allowed by elongated holes 62. The bearing bushing 52 is supported with a collar 53 on the end of the sliding bushing 54 shown on the left in FIGS. 8 and 9. The bushings 52 and 54 are supported with the collars 53 and 55 and thus the pin guide 50 is supported in the axial direction on a wall 64 of the eye 42, as can be seen in FIGS. 5 and 6. On its side facing away from the suspension eye lug 22, that is, on its right side in FIG. 9, the main pin 50 has a force transmission contact 66 for a not-shown tool. On the left side of the main pin 40 in FIG. 9, its longitudinal hole 56 has a part that forms a threaded hole 57 of smaller diameter whose thread is designated with 59.

The suspension eye lug 22 is a component that can be fixed detachably to the fastening tab 23 on the supporting structure 14, as already mentioned above. An impact damping bushing 46 that carries a centrally arranged bushing 48 is arranged in an eye 44 of the suspension eye lug 22 as a receiver 30 for the main pin 40. The bushing 48 contains a receiver hole 49 in which the main pin 40 can be inserted. The receiver 30 of the suspension eye lug 22 has a stop 70 for the main pin 40. The stop 70 is formed by a screw 72 in the shown embodiment. The screw 72 is anchored locked in rotation in the bushing 48. The thread of the screw 72 corresponds to the thread 59 of the threaded hole 57 of the main pin 40, so that the screw 72 can be screwed into the threaded hole 57 by turning the main pin 40. Until then, the screw 72 forms the stop 70 on which the main pin 40 comes into contact in its movement out from the main pin guide 50 due to the bias loading of the spring 58, as shown in FIG. 5.

Figure 11:
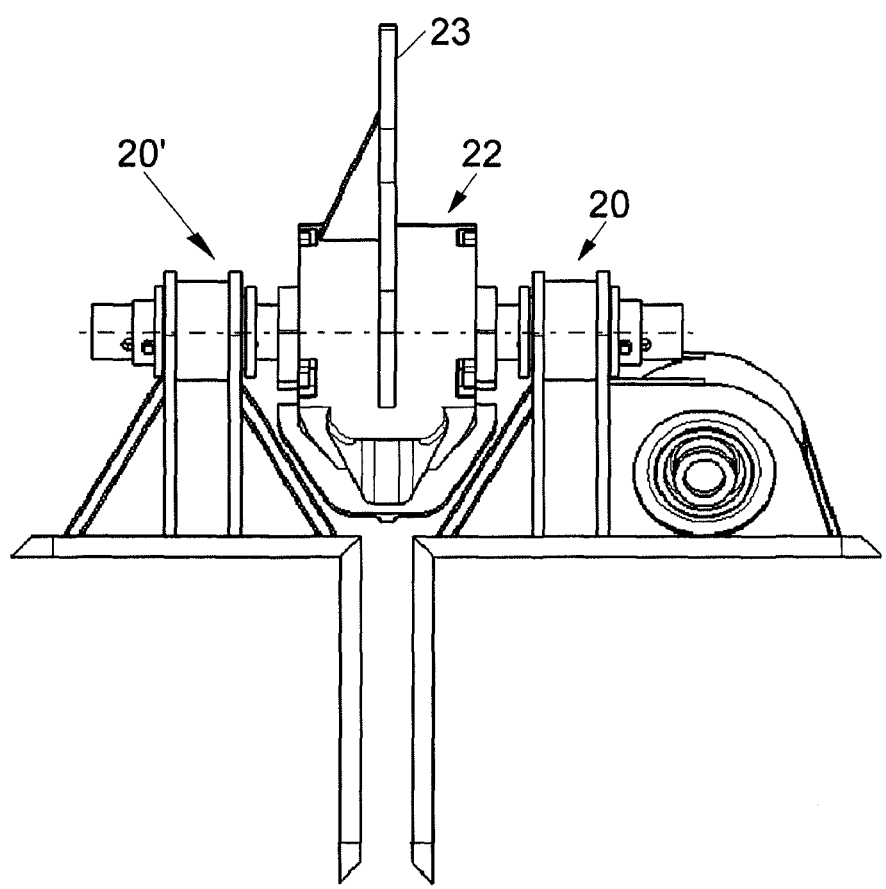
FIG. 11 is a side view showing the use of a double suspension eye lug in the fastening system according to the invention.

For the understanding of the invention described up to this point, only the right half of the suspension eye lug 22 shown in section in FIGS. 5 and 6 is of interest. The opposing left half has an identical, mirror-symmetric design when the suspension eye lug 22, as shown, is constructed as a double suspension eye lug for use as shown in FIG. 11.

According to the representation in FIG. 2, a part 25 of the suspension eye lug 22 is constructed like an inclined ramp. During the upward movement of the overhead storage bin 12 from the position shown in FIG. 1, the main pin 40 is pushed to the right in FIG. 2 by the ramp-like part 25, while the suspension eye lug 20 allocated to it is moved upward into the installation position shown in FIGS. 3 and 4. As soon as the main pin 40 reaches this position in which its axis coincides with the axis of the receiver 30, it is extended from the suspension eye lug 20 by the bias loading of the helical spring 58 into the receiver 30 of the suspension eye lug 22, into the position according to FIGS. 3 and 5 in which the main pin contacts the stop 70.

Figure 7:
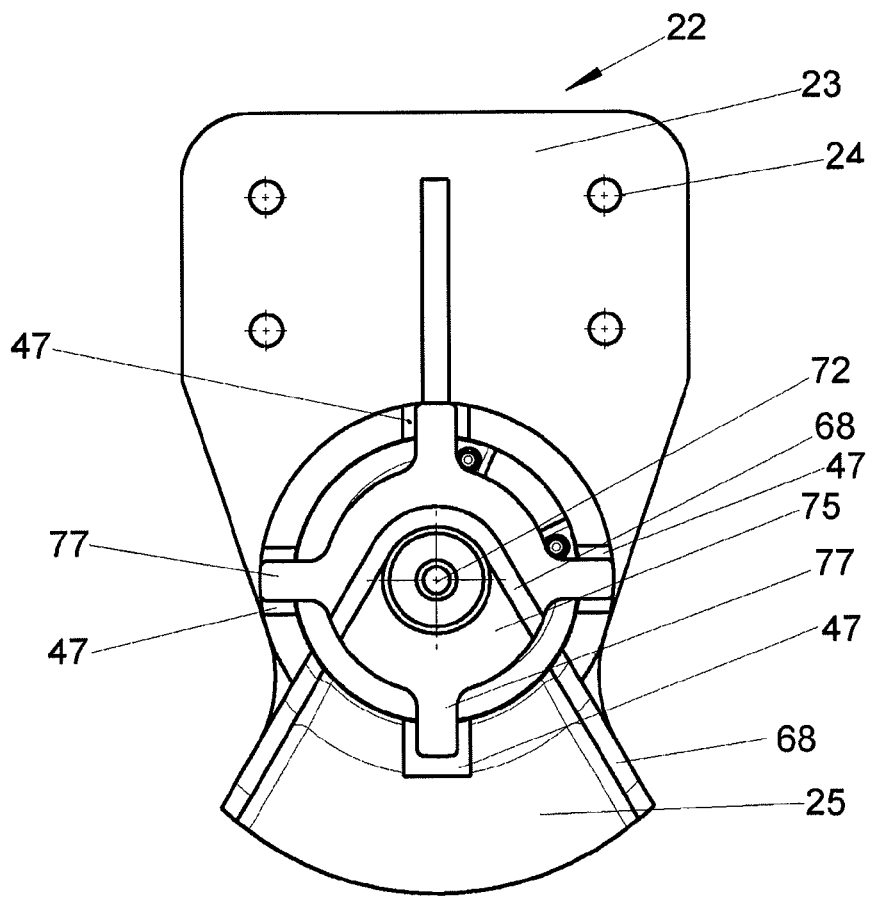
FIG. 7 is a detail of the upper suspension eye lug in FIG. 2 taken in the direction of an arrow VII in FIG. 2.
Figure 10:
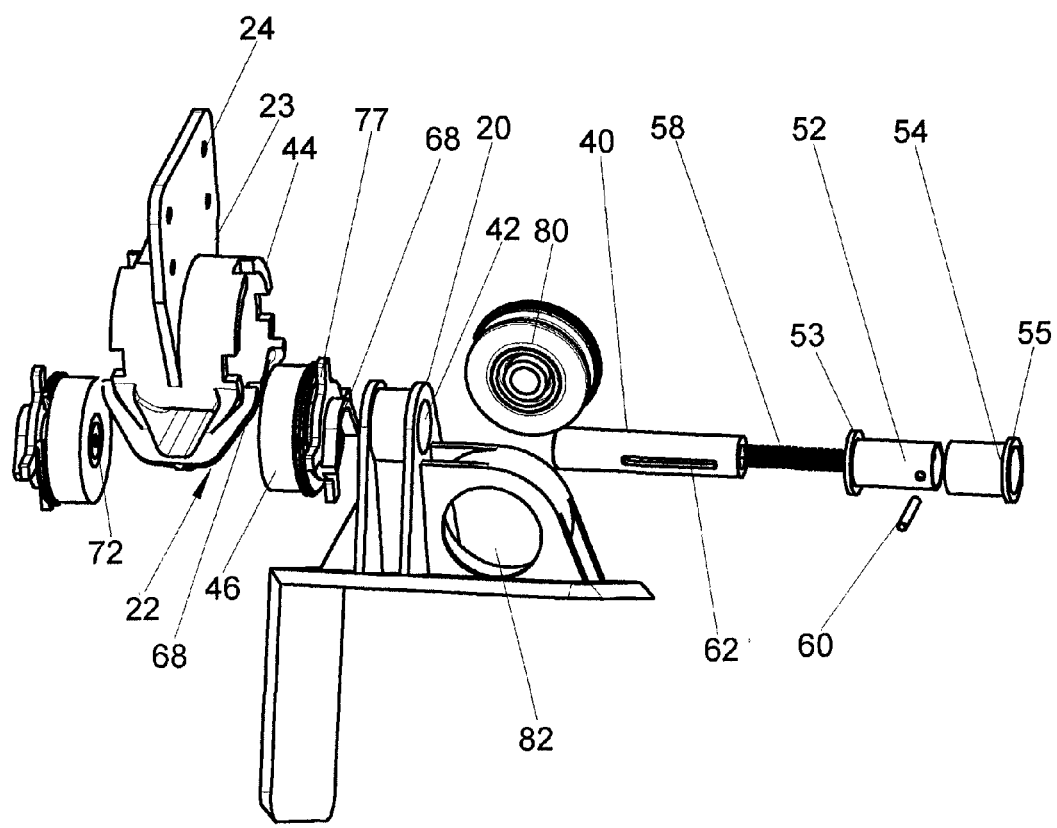
FIG. 10 is a view of the fastening system according to FIG. 3 or 4 in a pulled-apart representation.

The suspension eye lug 22 has a funnel-shaped contour 68 at least in its area surrounding the ramp-like part 25, wherein, in the embodiment shown here, the funnel-shaped contour 68 is also present in additional areas of the suspension eye lug 22, as can be seen in FIGS. 7 and 10. The funnel-shaped contour 68 leads the main pin 40 to the stop 70 on which it is first brought into contact and then fixed. The suspension eye lug 22 is also provided with grooves 47 that are used for the torque support of the impact damping bushing 46, that is, as torsion protection. A securing ring 45 prevents the impact damping bushing 46 from falling out from the eye 44. An inner ring 75 continues the contours of the suspension eye lug 22, in order to allow a simple and targeted introduction of the main pin 40. The inner ring 75 has pegs 77 that sit in the grooves 47 of the suspension eye lug 22 and are used for torque support of the impact damping bushing 46, that is, as torsion protection.

Through manual activation of a tool inserted into the force transmission contact 66, the main pin 40 can be locked with a positive-fit connection to the stop 70. In the embodiment described here, the main pin 40 and the peg 70 can be locked to each other by a screw-thread connection. Instead, the main pin and the peg could also be locked with each other by a bayonet mount (not shown). Through the production of the thread connection or bayonet catch between the peg 70 and the main pin 40, the main pin reaches the position shown in FIGS. 4 and 6 in which the overhead storage bin 12 is fixed securely on the supporting structure 14. Only by detaching the thread connection or bayonet mount between the main pin 40 and the peg 70 is the fastening released again. As soon as the main pin has reached the position shown in FIG. 5 again, it can be pulled out from the receiver 30. This procedure is preferably performed with the help of a tool used for this purpose on its right end.

In the embodiment according to FIG. 11, instead of two suspension eye lugs arranged one next to the other, only one suspension eye lug 22 is provided that is constructed as a double suspension eye lug and has the structure already described above. In the eyes 44 of the double suspension eye lug, the two receivers 30 are arranged back to back, as can be seen in FIGS. 5 and 6.

The installation and removal of the overhead storage bin 12 will now be described in summary with reference to the representation in FIGS. 1-11.

FIG. 1 shows the starting positions of the suspension eye lugs 20 and 22. In the starting position of the suspension eye lug 20, the main pin 40 is extended out from the main pin guide 50 into an end position shown in FIG. 1. In this position, the main pin 40 is biased in the extension direction by the helical spring 58. At least three people (or one person operating a lifting device) now lift the overhead storage bin 12 until the main pin 40 reaches the ramp-like part 25 and is pushed increasingly to the right in FIG. 2 with increasing upward movement of the overhead storage bin 12. As soon as the suspension eye lug 20 reaches the installation position shown in FIG. 3 in which the longitudinal axis of the main pin 40 and the longitudinal axis of the receiver 30 of the suspension eye lug 22 are in a line, the helical spring 58 that has been increasingly set in tension up to reaching this position pushes the main pin 40 entering into the receiver 30 against the stop 70, so that the main pin 40 assumes the position shown in FIG. 5. By rotating the main pin 40 about its longitudinal axis, it is screwed onto the screw 72 forming the stop 70, wherein the main pin 40 finally reaches the position shown in FIG. 6 in which the fastening system 10 is secured. As soon as the main pin 40 reaches the position shown in FIGS. 3 and 5, the overhead storage bin 12 is already temporarily locked on the suspension eye lug 22, so that at least one of the persons lifting the overhead storage bin 12 into the installation position is free to turn the main pin 40 with the help of a tool inserted into the force transmission contact 66 until the main pin 40 and thus the overhead storage bin 12 is finally secured in the installation position according to FIGS. 4 and 6.

For removing the overhead storage bin 12, the main pin 40 is turned in the reverse direction until it has again reached the position according to that in FIGS. 3 and 5 in which the fastening system 10 is unlocked. The main pin 40 can now be pushed out by hand from the receiver 30 of the suspension eye lug 22 and the overhead storage bin 12 can be lowered again.

In the representation in FIG. 11, a right suspension eye lug 20 and a left suspension eye lug 20' are attached one next to the other on two adjacent overhead storage bins 12 on a double suspension eye lug 22 attached to the supporting structure 14, wherein the mounted and secured state as in FIGS. 4 and 6 is shown in FIG. 11.

Another impact damping bushing that is also shown in the figures and is designated with 80 in FIG. 10 and is attached in another eye 82 of the suspension eye lug 20 is not part of the invention. For the sake of completeness, it shall be mentioned only that the impact damping bushing 80 absorbs forces occurring in the X-direction and transmits these, for example, by means of a not-shown tension bar that is connected directly to the supporting structure 14.

Finally it should be stated that not only the suspension eye lugs 20, 20', 22, but also all parts of these suspension eye lugs are interchangeable from one suspension eye lug to another, so that, e.g., the main pin guide 50 could be attached to the suspension eye lug 22 instead of the suspension eye lug 20 and the receiver 30 for the main pin 40 and the ramp-like part 25 could be attached to the suspension eye lug 20 instead of the suspension eye lug 22.

REFERENCE SYMBOLS

10 Fastening system
12 Overhead storage bin
14 Supporting structure
20 Suspension eye lug
22 Suspension eye lug
23 Fastening tab
24 Hole
25 Ramp-like part
30 Receiver
32 Receiver
40 Main pin
42 Eye
44 Eye
45 Securing ring
46 Impact damping bushing
47 Groove
48 Bushing
49 Receiver hole
50 Main pin guide
52 Bearing bushing
53 Collar
54 Slide bushing
56 Longitudinal hole
57 Threaded hole
58 Helical spring
59 Thread
60 Transverse pin
62 Elongated hole
64 Wall
66 Force transmitting drive
68 Funnel-shaped contours
70 Stop
72 Screw
75 Inner ring
77 Peg
80 Impact damping bushing
82 Eye

The invention claimed is:

1. Fastening system for fastening one or more overhead storage bins on a supporting structure in a suspended manner, comprising:
at least one pair of suspension eye lugs, including a first lug and a second lug, wherein each lug of the pair is attachable to a respective one of the supporting structure or to one of the overhead storage bins, and wherein each lug extends substantially parallel to, and on opposite sides of, a substantially vertical plane,
the first lug comprising a main pin movably mounted therein, the main in being slidable in a substantially horizontal direction, and
the first and second lugs each including a receiver[s] that aligns with the other receiver in an installation position of the overhead storage bin,
wherein the second lug comprises an inclined ramp adjacent the receiver of the second lug, and
wherein a main pin guide is provided in the receiver of the first lug, and the main pin is spring loaded in the main pin guide so as to be biased toward an end position in which the main pin is extended out from the main pin guide, and in which a proximal end of the main in is vertically aligned with the inclined ramp,
wherein when the overhead storage bin is moved vertically toward the installation position, the main in slidably engages the inclined ramp, thereby moving the main in against the spring bias, away from the end position, until the receivers of both lugs are aligned in the installation position, at which point the main pin is biased into the receiver of the second lug, and
the receiver of the second lug comprises a stop therein on which the main pin can be brought into contact, and the main pin is lockable with a positive-fit connection to the stop by manual activation, wherein the stop is a peg arranged centrally in the receiver of the second lug and the main pin has a complementarily shaped hole in which the peg is held.

2. Fastening system according to claim 1, wherein the second lug has a funnel-shaped contour at least in an area surrounding the inclined ramp.

3. Fastening system according to claim 1, wherein, the main pin (40) and the peg are lockable each other by a screw-thread connection.

4. Fastening system according to claim 1, wherein, the main pin (40) and the peg are lockable with each other by a bayonet mount connection.

5. Fastening system according to claim 1, wherein the main pin has a force transmitting drive for a tool on a distal end facing away from the second lug.

6. Fastening system according to claim 1, wherein the main pin (40) has an inner longitudinal hole (56) in which a helical spring (58) is arranged for generating the spring bias loading, and the helical spring is supported at one end on the main pin (40) and at the other end on a transverse pin (60) that is anchored in the receiver (32) and is held so that it can move in two adjacent elongated holes (62) of the main pin (40).

7. Fastening system according to claim 1, wherein the at least one pair of suspension eye lugs comprises a first pair of suspension eye lugs and the system further comprises a second pair of suspension eye lugs which are attachable one next to the other on two adjacent suspension points of two adjacent overhead storage bins.

8. Fastening system according to claim 7, wherein the main pins of each of the first and second pairs of suspension eye lugs can be extended into an installation position and comprise a compound suspension eye lug in which multiple receivers are arranged.

9. Fastening system according to claim 8, wherein the compound suspension eye lug is constructed as a double suspension eye lug in which two of the receivers are arranged back to back.

10. Fastening system according to claim 1, wherein the overhead storage bins are luggage containers in an aircraft.

* * * * *